United States Patent [19]

Glover et al.

[11] Patent Number: 4,843,883

[45] Date of Patent: Jul. 4, 1989

[54] DIFFERENTIAL PRESSURE FLUID LEVEL SENSOR

[75] Inventors: Alfred H. Glover, Decatur; Daniel F. Lawless, Hazel Green, both of Ala.

[73] Assignee: Chrysler Motors Corporation, Highland Park, Mich.

[21] Appl. No.: 274,080

[22] Filed: Nov. 21, 1988

[51] Int. Cl.⁴ ............................................. G01F 23/14
[52] U.S. Cl. ....................................... 73/301; 73/719; 73/1 H; 338/42
[58] Field of Search ..................... 73/301, 719; 338/42

[56] References Cited

U.S. PATENT DOCUMENTS

| | | |
|---|---|---|
| 2,439,092 | 9/1946 | Linstrom . |
| 2,651,939 | 9/1953 | Weaver . |
| 2,943,302 | 6/1960 | Clason . |
| 3,242,731 | 3/1966 | Colgan . |
| 4,335,608 | 6/1982 | Wood et al. ............................ 73/301 |
| 4,358,956 | 11/1982 | Ruben et al. ........................... 73/301 |

Primary Examiner—Daniel M. Yasich
Attorney, Agent, or Firm—Kenneth H. MacLean, Jr.

[57] ABSTRACT

A liquid fluid level sensor responds to differential pressure forces exerted on a diaphragm as produced by exposure of liquid fluid to one side and of atmosphere to the other side. An arched resistance card is movable with the diaphragm to engage the mid-portion of a metal spring which progressively overlies greater portions of the card as the diaphragm moves thereby changing the resistance of a circuit including the card and the spring.

7 Claims, 2 Drawing Sheets

DIFFERENTIAL PRESSURE FLUID LEVEL SENSOR

BACKGROUND OF THE INVENTION

There has always been a need for an accurate, durable and relatively inexpensive sensor to sense the level of liquid fuel such as in a vehicle's fuel tank. A desirable level sensing device should have few moving parts and the active portions of the device should be protected from damage and contamination as well as be separated from the fluid itself.

U.S. Pat. No. 2,439,092 to Linstrom discloses an apparatus for indicating pressure having a bowed electrical contacting element and a diaphragm to flex into the element.

U.S. Pat. No. 3,242,731 to Colgan discloses a differential pressure indicating device having a bowed, bendable resistor element.

U.S. Pat. No. 2,651,939 to Weaver discloses a level sensing device with a submerged housing and a tubular element for venting the housing and for leading wires therefrom to the top of a tank.

U.S. Pat. No. 2,943,302 discloses a device for sensing pressure including a curved resistor board and a pivotal contact assembly.

SUMMARY OF THE INVENTION

The subject application concerns a liquid fluid level sensor operable by a differential force acting on a diaphragm or the like caused by exposure of one side to a liquid fluid and of an opposite side to atmospheric pressure. The diaphragm moves an arched resistor card against the mid-portion of a grounding spring thereby progressively grounding greater portions of the resistor.

Specifically, a sensor housing is submerged in liquid fluid. In the housing, an elongated resistor card is attached at its end portions to the diaphragm assembly so that the card's mid-portion is arched away from the diaphragm. A ground connected spring is stretched over the arched card so that its midpoint just engages the midpoint of the card when the housing is barely submerged by fluid. As the fluid level increases, the diaphragm moves the arched resistor card against the spring's midpoint to progressively engage more of the card with the grounded spring.

The sensor's structure as generally described above effectively senses fluid levels by the differential pressure method. Other features and further advantages of the subject embodiment will be better understood by reference to the drawings of a specific embodiment as described below and the detailed description of a preferred embodiment that follows.

IN THE DRAWINGS

FIG. 1 is a partially sectioned elevational view of the subject sensor device; and FIG. 2 is a perspective and exploded view of the sensor's main active parts; and FIG. 3 is an enlarged sectional partial view of the circled portion in FIG. 1.

DESCRIPTION OF A PREFERRED EMBODIMENT

Figure 1:
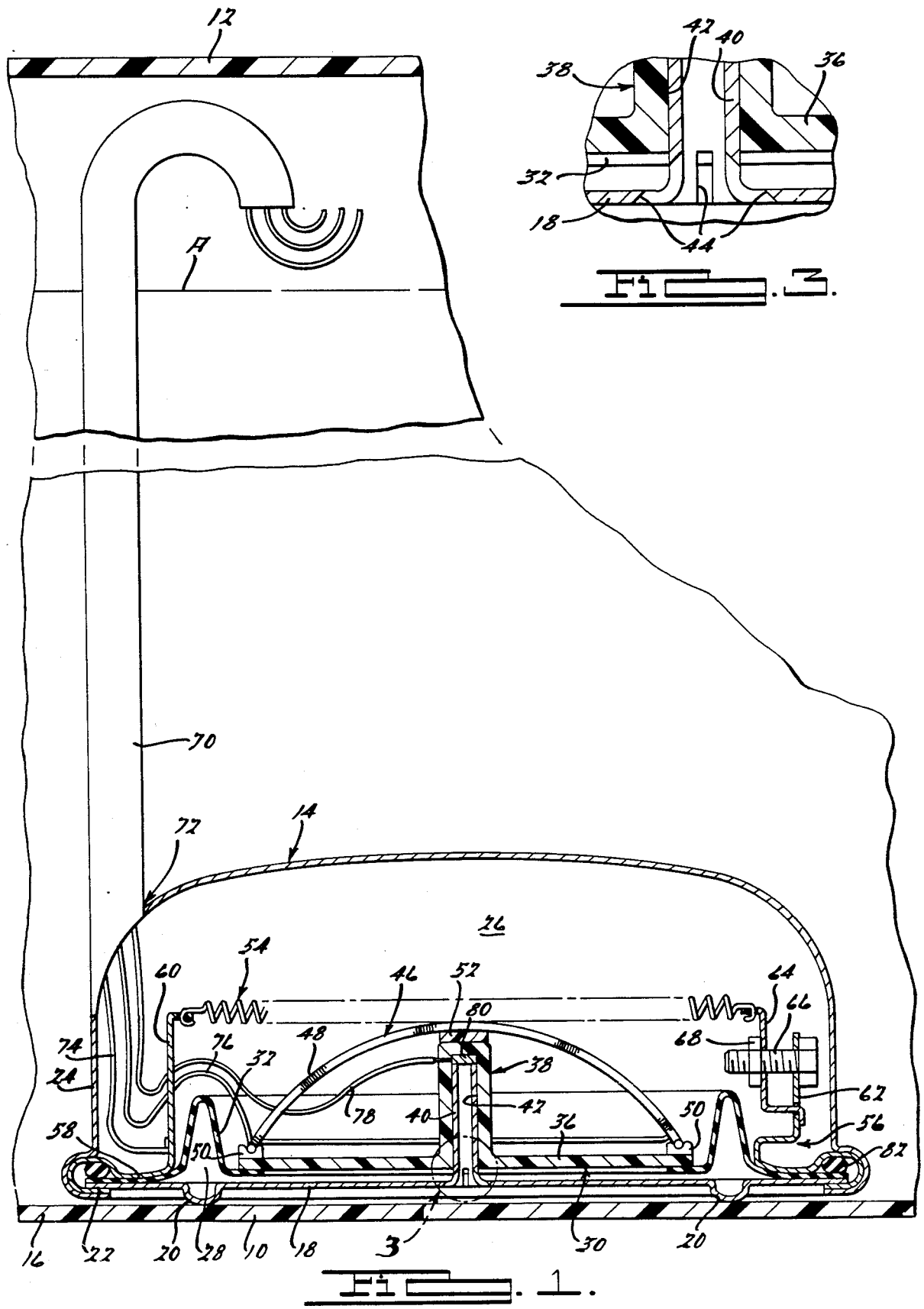
Figure 2:
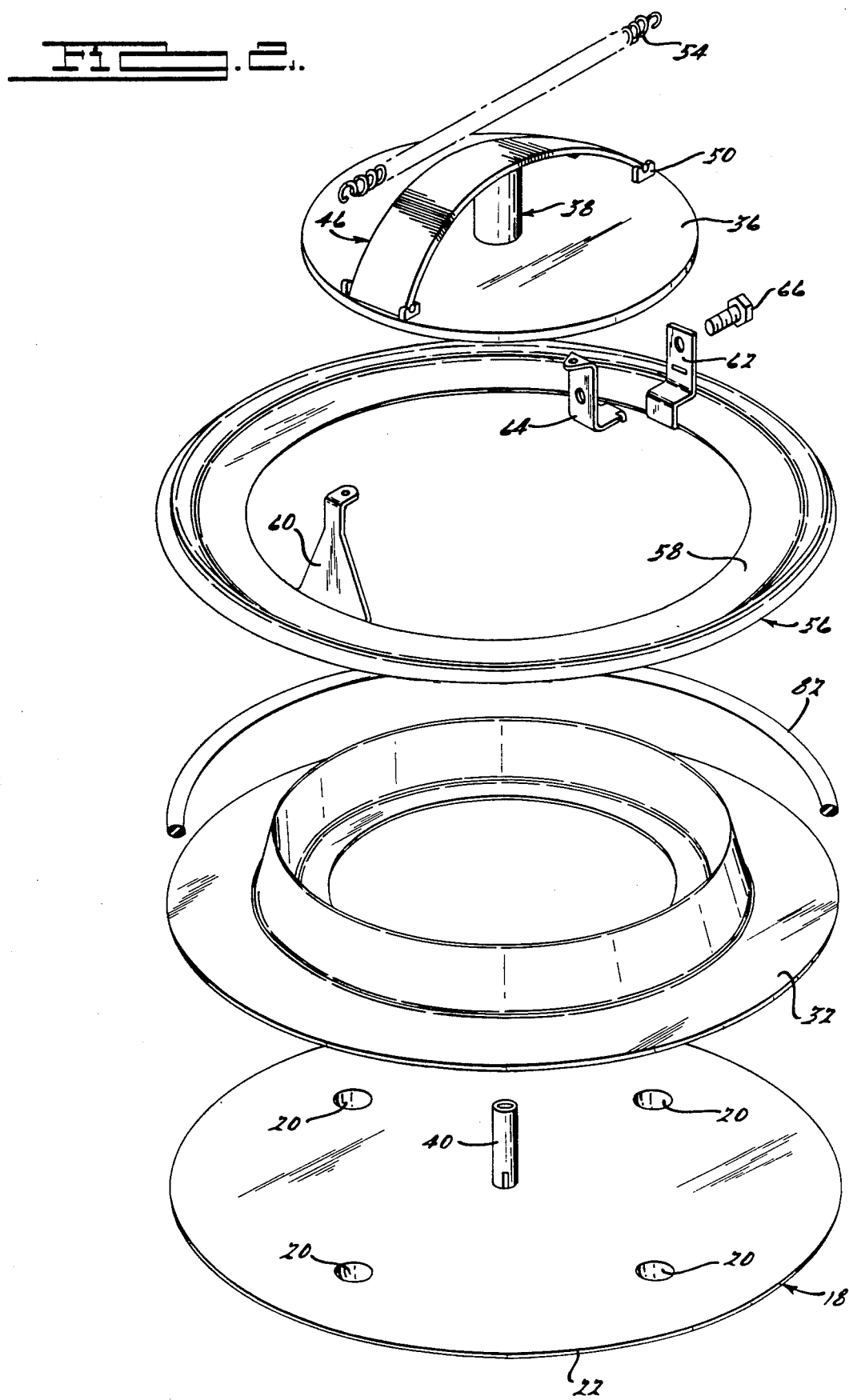

In FIG. 1, portions of a vehicle fuel tank are shown. Specifically, the tank's lower or bottom wall 10 and upper wall 12 are illustrated. A device 14 for sensing and determining the fluid level is shown in a position resting on the inner surface 16 of the bottom wall 10 of the fuel tank. Sensor device 14 includes a housing defining an enclosure which has a base member 18. Base 18 has a plurality of dimples 20 which act to space the base upward from the tank bottom 10.

The base member 18 has a peripheral edge 22 which is operatively connected to a thin-walled cover member 24. Member 24 forms the other main component of the enclosure forming housing. The base 18 and the cover 24 define an interior space in which active components of the sensor are found as better explained hereinafter. The enclosure of members 18 and 24 is separated into a first chamber 26 and a second chamber 28 by a movable wall in the form of a diaphragm assembly 30. Specifically, the assembly 30 includes a flexible member 32 of rubber-like material. The outer peripheral edge 34 of the member 32 is secured between the edges of the base and cover members 18 and 24. The inner peripheral edge of the member 32 is attached to a rigid guide member 36.

The members 32 and 36 are adapted to move in the enclosure as the pressures in the chambers 26 and 28 change relative to one another. Resultantly, the volumes of chambers 26, 28 change. When the fluid pressure in the first chamber 26 is greater than the fluid pressure in the second chamber 28, the diaphragm assembly assumes the position shown in FIG. 1. This corresponds to a near empty fuel tank. Fluid in the tank is communicated with the chamber 28. Resultantly, as the fluid level in the tank increases, the pressure in chamber 28 increases and the assembly 30 is moved upward from the position shown in FIG. 1.

Movement of the diaphragm assembly 30 is restricted to a direction normal to the base member 18. This restricted movement is accomplished by sliding interaction between a protruding mid-portion 38 of the member 36 and a tubular portion 40 of member 18. Specifically, the tubular portion 40 extends into a bore 42 in the mid-portion 38 to guide movement of the diaphragm member 30. As previously indicated, chamber 28 communicates with the fluid in the fuel tank interior. As best shown in FIG. 3, the communication takes place through a plurality of slots 44 formed in the base member 18 generally at the location where the tubular portion 40 intersects the main portion of the base portion 18.

Referring to FIGS. 1 and 3, the member 36 supports an elongated resistor board or card 46. The card 46 is wound with thin wire 48 from end to end in a conventional manner for resistors. Both of the card's ends are supported by support pads 50 which are firmly connected to member 36. The elongated card 46 has a generally curved configuration or an arched shape relative to the member 36. The card's mid-portion is supported by an insulating member 52 resting on the end of the projecting member 38.

An elongated metal spring 54 is supported in spaced parallelism with base 18 and above the resistor card 46. Spring 54 is a coil type spring supported at opposite ends in tension. As best illustrated in FIG. 1, the spring ends are attached to a spring support assembly 56 which includes an annularly shaped ring portion 58 with a peripheral edge portion overlying the edges of the base member 18 and the flexible portion 32 of the diaphragm assembly 30. At both the leftward and the rightward sides of the device in FIG. 1, arm portions 60 and 62 respectively extends upward. At the left side, the end of the spring 54 attaches to the upper end of arm portion 60. At the right side, the right end of the spring 54 attaches to an upper end of a tension adjusting member 64. A lower end of member 64 extends through a small opening in the arm portion 62 to form a pivotal connection therewith. A calibration screw 66 extends through an opening in the upper end of arm portion 62 and threadably into a thickened portion 68 on the tension adjusting member 64.

To calibrate the above described device, the calibration screw is rotated. This changes the tension of the spring 54. As fluid pressure forces move the diaphragm assembly 30 and the arched card 46 upward, the arched card 46 is progressively pressed against the mid-portion of the spring thereby distorting it upwardly. The stronger the spring's tension, the greater is the resistance to movement of the assembly 30. By rotation of the screw, this resistance can be easily adjusted.

The first chamber 26 in which the active parts 46 and 54 are located is maintained at a substantially constant reference pressure relative to the variable fluid pressure in chamber 28 which is dependent on the fluid level. It is convenient to use atmospheric pressure as this reference. Accordingly, a tubular vent member 70 is attached to the cover member 14 by a soldered connection 72. The tubular member 70 opens at the lower end to chamber 26 and to the upper end to the upper portion of the fuel tank. Note that the maximum level of liquid which is allowed to fill the tank is at level A in FIG. 1. Level A is below the upper opening in the tubular member 70. This maximum level is dictated by conventional vent control apparatus which is not shown in the drawings and not an essential part of this invention. Modern vehicles provide such a system and apparatus which also maintains the tank interior at or near atmospheric pressures. However, if so desired, the tubular member 70 could be extended through the upper wall 12 of the tank in sealed manner. The subject sensor would work in the same manner.

In addition to acting as a vent, the above identified tubular member 70 provides a convenient means to route electrical wires to the sensor's active parts. Wire 74 is a grounding wire and is attached to the arm portion 60. Wire 76 is attached to the wire ends of the resistor card 46. Wire 78 is attached through the portion 38 to a contact pad 80 fixed at the top of the bore 42. When the fluid level in the tank is at the very low fluid level which is illustrated, the upper end of the tubular projection 40 contacts the pad 80 to complete a circuit through the ground for indication of a low fuel level.

Before describing the operation of the sensor, there is one more structural feature worth noting. In sensors of this type, it is desirable to separate the sensor's active parts such as card 42 and spring 54 from the liquid fluid. Thus, it is desirable to seal the enclosure. The present sensor utilizes a large O-ring 82 between the outer edge 34 of the diaphragm 32 and the edge 58 of the spring support assembly 56. The enclosure is held together by rolling the edges of the cover and the spring support assembly over the edge 22 of the base member 18.

When the fluid level increases in the tank, the pressure is chamber 28 correspondingly increases. This creates an increasing differential pressure upward force on the diaphragm assembly 30 and resistor card 46. This movement presses the midpoint of the arched card 46 against the mid-point of the spring 54 causing it to be distort upward. Resultantly, the spring 54 progressively overlies greater portions of the elongated resistor card 46 and a greater length of the resistance is grounded. As a result, the total resistance decreases as the fluid level increases. This is used to provide a remote indication of the fluid level in the tank.

Although only a single embodiment of the subject sensor has been shown and described herein, it is easily understood that the invention is not limited to details of this embodiment since modifications are possible but which still are covered by the following claims which define the invention.

We claim:

1. A device adapted to be supported in a liquid fluid storage tank for sensing the liquid level therein, comprising: enclosure means which define an interior space; a movable wall separating the enclosure interior into first and second variable volume chambers; an elongated resistor member in the first chamber being supported at both ends by the movable wall, the resistor member being arcuately shaped and with its midpoint arched away from the movable wall; vent means through the enclosure to communicate the first chamber to atmospheric pressure, the vent means including an elongated tubular member; means through the enclosure for communicating the second chamber with the fluid in the lower portion of the storage tank, whereby forces generated by the fluid pressure and by the atmospheric pressure acting on opposite sides of the movable wall causes wall movement in the enclosure proportional to the fluid level above the enclosure; an elongated metal member in the first chamber supported in tension above and in substantial parallelism with the ends of the resistor card and with its midpoint closely adjacent the arched mid-point of the resistor card, the metal tension member being yieldable in a direction normal to its axis; electrical circuit means between the ends of the resistor member and the elongated metal member, whereby movement of the movable wall in response to an increased differential pressure thereon causes the arched resistor member to press against the midpoint of the metal tension member which results in the tension member engagingly overlying increased portions of the elongated resistor member as the metal tension member is deflected thus varying the electrical resistance of the circuit means corresponding to fluid levels over the device.

2. A device adapted to be supported in a liquid fluid storage tank for sensing the liquid level therein, comprising: enclosure means which define an interior space; diaphragm assembly separating the enclosure interior into first and second variable volume chambers, including a rigid central portion and a flexible outer portion which permits the assembly to move in the enclosure means; vent means through the enclosure to communicate the first chamber with atmospheric pressure, the vent means including an elongated tubular member; means through the enclosure to communicate the second chamber with the fluid in the lower portion of the storage tank, whereby a net force generated by the fluid pressure and by the atmospheric pressure acting on opposite sides of the diaphragm assembly produces a movement of the diaphragm assembly in the enclosure proportional to the fluid level above the enclosure; an elongated resistor member in the first chamber supported at both ends by the rigid central portion of the diaphragm assembly, the resistor member being arcuately shaped and with its midpoint arched away form the rigid central portion; an elongated metal spring means in the first chamber supported in tension above the resistor member and in substantial parallelism with the ends of the resistor member, the midpoint of the spring means being closely adjacent the arched mid-portion of the resistor member when the diaphragm assembly is at a low fluid operative position, whereby the spring means is yieldable in a direction normal to its axis; electrical circuit means between the ends of the resistor member and the metal spring means, whereby movement of the diaphragm assembly in response to an increased fluid level causes the arched resistor member to press against the spring means and progressively distort the spring means normally to its axis and thereby engaging greater portions of the elongated resistor member thereby progressively changing the electrical resistance of the circuit proportionally to fluid levels over the device.

3. The device set forth in claim2 in which one end of the spring means is fixed and the opposite end is supported in a manner permitting the tension to be varied.

4. The device set forth in claim 3 in which the variable support of the spring end includes a pivotal arm which is threadably attached to a stationary portion of the enclosure by a rotative adjusting member so that rotation thereof varies the tension in the spring member.

5. The device set forth in claim 2 in which the central portion of the diaphragm assembly has a projection directed normally therefrom and defining a guide bore therein; the enclosure means having an extension located in correspondence to the guide bore so the extension and the guide bore directs movements of the diaphragm assembly relative to the enclosure.

6. The device set forth in claim 5 in which an electrical contact is supported by the projection of the diaphragm assembly and in circuit with a low fluid level circuit; the enclosure extension being in circuit with the low fluid level circuit and engaging the contact when the fluid level is low and not otherwise.

7. A storage tank defining an interior space for liquid fluid, a liquid fluid sensor device including an enclosure housing supported in the lowest portion of the tank, the enclosure housing having an interior space, a movable diaphragm assembly in the interior space of the enclosure separating it into first and second variable volume chambers, vent means including an elongated tubular member for communicating the first chamber with atmospheric pressure, inlet means through the enclosure for communicating the second chamber with the fluid in the lower portion of the storage tank, an elongated resistor member in the first chamber and being supported at both ends by diaphragm assembly, the resistor member being arcuately shaped and supported with its midpoint arched away from the diaphragm assembly, an elongated metal spring means in the first chamber supported in tension above and in substantial parallelism with the ends of the resistor member, the midpoint of the spring means being located closely adjacent the arched mid-point of the resistor member when the diaphragm member is in a position corresponding to a low fluid level, electrical circuit mean between the ends of the resistor member and the metal spring means, whereby movement of the diaphragm assembly and resistor member thereon in response to an increased differential pressure force thereon caused by an increase in the fluid level causes the arched resistor member to press against and move the spring means radially thus engaging a progressively greater portion of the resistor member which changes the circuit resistance.

* * * * *